US012208609B2

(12) United States Patent
Kitazawa

(10) Patent No.: US 12,208,609 B2
(45) Date of Patent: Jan. 28, 2025

(54) PRINTING APPARATUS AND CONTROL METHOD OF PRINTING APPARATUS

(71) Applicant: CANON KABUSHIKI KAISHA, Tokyo (JP)

(72) Inventor: Toshiyuki Kitazawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 18/093,864

(22) Filed: Jan. 6, 2023

(65) Prior Publication Data

US 2023/0249480 A1 Aug. 10, 2023

(30) Foreign Application Priority Data

Feb. 10, 2022 (JP) ................................ 2022-019458

(51) Int. Cl.

*B41J 29/393* (2006.01)
*B41J 11/00* (2006.01)
*B41J 13/32* (2006.01)

(52) U.S. Cl.

CPC ............ *B41J 13/32* (2013.01); *B41J 11/009* (2013.01)

(58) Field of Classification Search

CPC .............................. B41J 11/009; B41J 29/393
See application file for complete search history.

(56) References Cited

FOREIGN PATENT DOCUMENTS

JP 2020-085589 A 6/2020

*Primary Examiner* — Julian D Huffman
(74) *Attorney, Agent, or Firm* — Venable LLP

(57) ABSTRACT

The printing apparatus includes a light source that emits light to a first surface of a printing sheet; a sensor that detects the light reflected from the printing sheet; a reflection member located at a position facing the sensor and coming into contact with a second surface opposite to the first surface of the printing sheet; and a control unit configured to determine a type of the printing sheet based on a feature amount obtained by the sensor detecting the light from a plurality of positions of the printing sheet being conveyed, wherein a first area and a second area whose reflectance is lower than that of the first area are included in the reflection member and a position corresponding to the first area and a position corresponding to the second area are included in the plurality of positions.

15 Claims, 9 Drawing Sheets

PRINTING APPARATUS AND CONTROL METHOD OF PRINTING APPARATUS

BACKGROUND OF THE DISCLOSURE

Field of the Disclosure

The technique of the present disclosure relates to a printing apparatus and a control method of a printing apparatus.

Description of the Related Art

Some printing apparatuses, such as copy machines and printers, internally comprise a sensor for determining the type of printing sheet. Among these printing apparatuses, some printing apparatuses perform control in accordance with the type of printing sheet, such as setting of fixing conditions in accordance with determination results and print control, by determining the type of printing sheet based on the sensor.

Japanese Patent Laid-Open No. 2020-85589 has disclosed an image forming apparatus that determines the type of printing sheet before feeding the printing sheet by providing a transmissive optical sensor in a manual feed tray and obtaining the quantity of transmitted light at a plurality of positions of the printing sheet.

There are various and a variety of printing sheets that are used by a printing apparatus and the optical characteristics of the printing sheet are different for different types. In Japanese Patent Laid-Open No. 2020-85589, the type of printing sheet is determined by measuring the quantity of transmitted light, but by only the difference in the quantity of transmitted light, there is a case where it is difficult to determine the type of printing sheet. For example, with the method described in Japanese Patent Laid-Open No. 2020-85589, it is difficult to determine a plurality of pieces of plain paper whose base weight is the same but whose nature of surface is different.

SUMMARY OF THE DISCLOSURE

The printing apparatus of the present disclosure is a printing apparatus including: a light source configured to emit light to a first surface of a printing sheet; a sensor configured to detect the light reflected from the printing sheet; a reflection member located at a position facing the sensor and coming into contact with a second surface opposite to the first surface of the printing sheet, the first surface receiving the light at the time of the printing sheet receiving the light; a conveyance mechanism configured to convey the printing sheet; and a control unit configured to determine a type of the printing sheet based on a feature amount obtained by the sensor detecting the light from a plurality of positions of the printing sheet being conveyed, wherein a first area and a second area whose reflectance is lower than that of the first area are included in the reflection member and a position corresponding to the first area and a position corresponding to the second area are included in the plurality of positions.

Further features of the present disclosure will become apparent from the following description of exemplary embodiments with reference to the attached drawings.

DESCRIPTION OF THE EMBODIMENTS

In the following, with reference to the attached drawings, embodiments of the technique of the present disclosure are explained. The following embodiments are not intended to limit the technique of the present disclosure and all combinations of features explained in the following embodiments are not necessarily indispensable to the solution of the technique of the present disclosure. Further, in the following embodiments, as an example, explanation is given by assuming that the printing apparatus is an ink jet printing apparatus.

First Embodiment

[General Configuration of Ink Jet Printing Apparatus]

Figure 1:
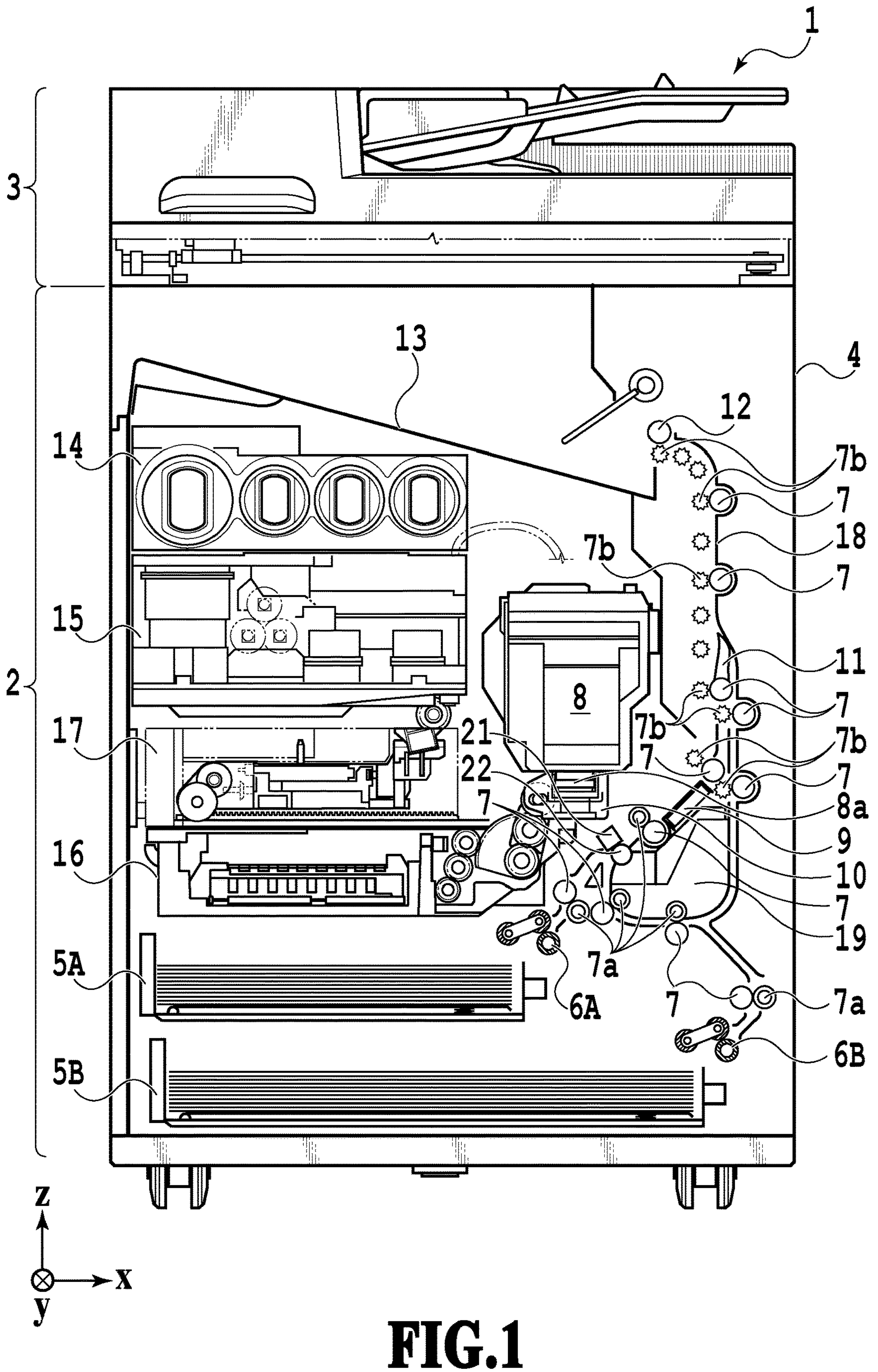
FIG. 1 is a diagram showing an internal configuration of a printing apparatus.

FIG. 1 is an internal configuration diagram of an ink jet printing apparatus 1 (in the following, printing apparatus 1). In FIG. 1, an x-direction indicates the horizontal direction, a y-direction (direction perpendicular to paper surface) indicates the direction in which ejection ports are arrayed in a print head 8, to be described later, and a z-direction intersecting with the x-direction and the y-direction indicates the vertical direction, respectively.

The printing apparatus 1 is a multi function peripheral comprising a print unit 2 and a scanner unit 3 and capable of performing various kinds of processing relating to the printing operation and reading operation individually in the print unit 2 and the scanner unit 3 or in connection therewith. The scanner unit 3 comprises an ADF (Auto Document Feeder) and an FBS (Flat Bed Scanner) and is capable of reading a document that is automatically fed by the ADF and reading (scanning) a document placed on the document table of the FBS by a user. In the present embodiment, the printing apparatus having both the print unit 2 and the scanner unit 3 is shown, but a printing apparatus not comprising the scanner unit 3 may be accepted. FIG. 1 shows a standby state where the printing apparatus 1 is not performing the printing operation or the reading operation.

In the print unit 2, at the bottom in the vertically downward direction of a casing 4, a first cassette 5A and a second cassette 5B for accommodating printing sheet (cut sheets) S as printing media are installed detachably. In the first cassette 5A, comparatively small printing sheets whose size is less than or equal to the A4 size are accommodated in a flat stacked manner and in the second cassette 5B, comparatively large printing sheets whose size is less than or equal to the A3 size are accommodated in a flat stacked manner. In the vicinity of the first cassette 5A, a first feeding unit 6A for separating and feeding the accommodated printing sheets one by one is provided. Similarly, in the vicinity of the second cassette 5B, a second feeding unit 6B is provided. In a case where the printing operation is performed, the printing sheet S is selectively fed from one of the cassettes.

A conveyance roller 7, a discharge roller 12, a pinch roller 7*a*, a spur 7*b*, a guide 18, an inner guide 19, and a flapper 11 are each a conveyance mechanism for guiding the printing sheet S in a predetermined direction. The conveyance roller 7 is arranged on the upstream side and the downstream side in the conveyance direction of the print head 8 and is a drive roller that is driven by a DC motor 651 (see FIG. 6). The pinch roller 7*a* is a follower roller that nips the printing sheet S together with the conveyance roller 7 and rotates. The discharge roller 12 is arranged on the downstream side of the conveyance roller 7 and is a drive roller that is driven by a conveyance motor. The spur 7*b* nips and conveys the printing sheet S together with the conveyance roller 7 and the discharge roller 12 arranged on the downstream side of the print head 8.

A media determination sensor 21 is a sensor for determining the type (paper type) of the printing sheet S and is arranged on the upstream side in the conveyance direction of the print head 8 in the conveyance path configured by the conveyance mechanisms. It is assumed that the paper type that is determined based on the detection results of the media determination sensor 21 includes not only the paper type, such as plain paper, glossy paper, and art paper, but also the more detailed paper type, which is included in paper types of plain paper, such as plain paper whose base weight is different (thin plain paper and the like).

Irrespective of which of the first cassette 5A and the second cassette 5B the printing sheet S is conveyed from, the media determination sensor 21 is arranged at the position at which the conveyed printing sheet S can be read. A media determination sensor roller 22 is arranged on the side facing the media determination sensor 21 and by a press roller (see FIG. 5) provided on the side of the media determination sensor 21, the printing sheet S is pressed against the side of the media determination sensor roller 22 and conveyed. Due to this, the printing sheet S is conveyed at the focal distance suitable to the determination of the paper type by the media determination sensor 21.

The guide 18 is provided in the conveyance path of the printing sheet S and guides the printing sheet S in a predetermined direction. The inner guide 19 is a member extending in the y-direction and has a curved side surface and guides the printing sheet S along the side surface. The flapper is a member for switching the directions in which the printing sheet S is conveyed at the time of the double-sided printing operation. A discharge tray 13 is a tray for stacking and storing the printing sheet S for which the printing operation is completed and which is discharged by the discharge roller 12.

The print head 8 is a full-line type color ink jet print head and a plurality of ejection ports through which ink is ejected in accordance with print data is arrayed so as to cover the width of the printing sheet S along the y-direction in FIG. 1. In a case where the print head 8 is at the standby position, an ejection port surface 8*a* of the print head 8 faces downward in the vertical direction and is capped by a cap unit 10. At the time of performing the printing operation, by a print controller 201 (see FIG. 2), to be described later, control is performed so that the orientation of the print head 8 is changed for the ejection port face 8*a* to face a platen 9. The platen 9 is configured by a flat plate extending in the y-direction and supports the printing sheet S from the rear surface, for which the printing operation is performed by the print head 8.

An ink tank unit 14 stores each of inks of four colors to be supplied to the print head 8. Here, the inks of four colors refer to cyan (C), magenta (M), yellow (Y), and black (K) inks. An ink supply unit 15 is provided on the way of the flow path that connects the ink tank unit 14 and the print head 8 and adjusts the pressure and the flow rate of the ink within the print head 8 to an appropriate range. The printing apparatus 1 has a circulation-type ink supply system and the ink supply unit 15 adjusts the pressure of the ink that is supplied to the print head 8 and the flow rate of the ink that is collected from the print head 8 to an appropriate range.

A maintenance unit 16 comprises the cap unit 10 and a wiping unit 17 and performs the maintenance operation for the print head 8 by causing them to operate at predetermined timing.

In addition to the above, a manual feed tray enabling a user to replenish the printing sheet S without performing the operation to draw out the cassette may be included. The configuration is designed so that it is possible for the media determination sensor 21 to determine also the type of the printing sheet S accommodated in the manual feed tray.

[About Control Configuration]

Figure 2:
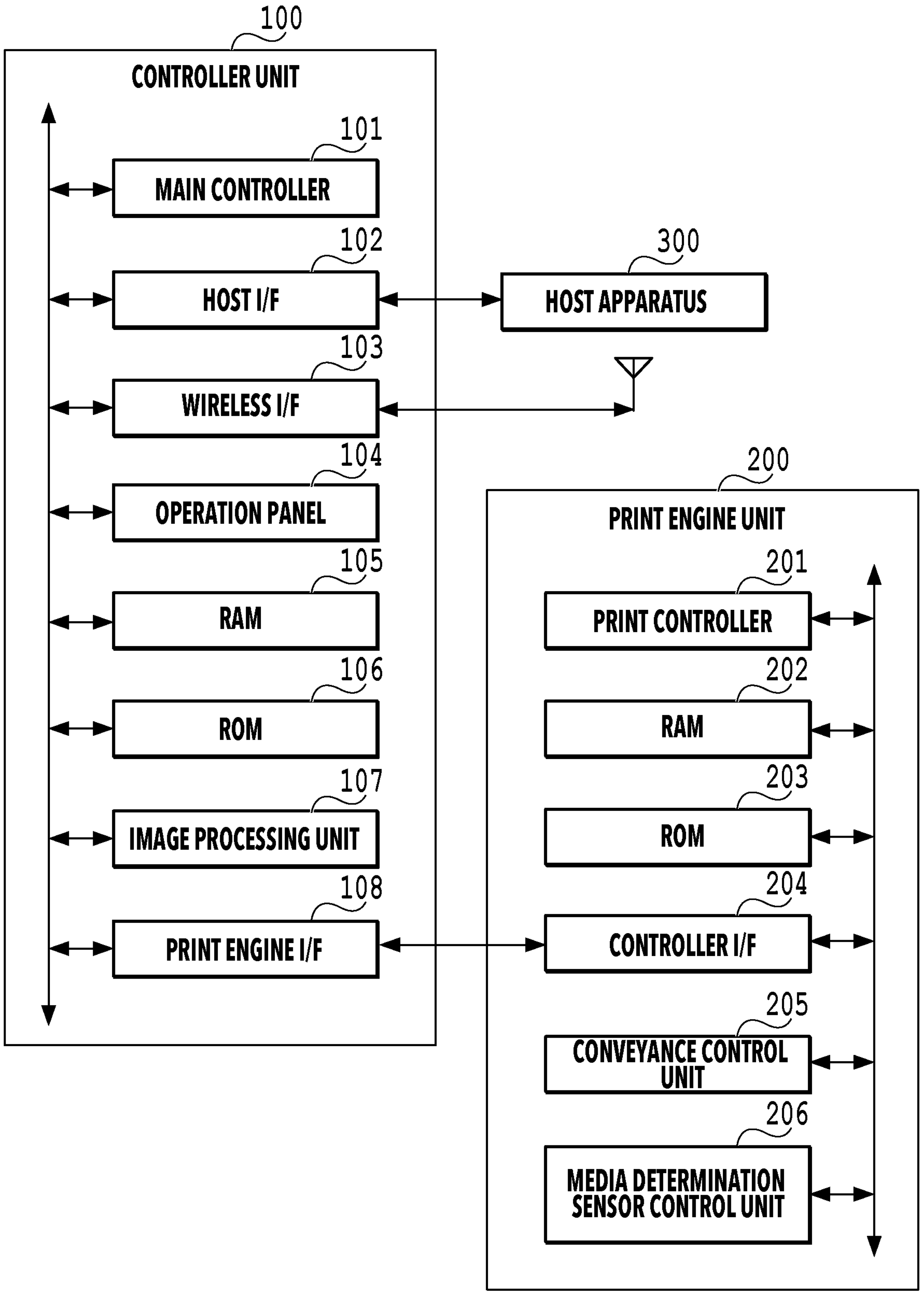
FIG. 2 is a diagram showing a configuration of a control system of the printing apparatus.

FIG. 2 is a block diagram showing part of the control configuration in the printing apparatus 1. The control unit of the printing apparatus 1 includes a controller unit 100 configured to comprehensively control the entire printing apparatus 1 and a print engine unit 200 configured to comprehensively control the print unit 2 mainly. In the following, details of the control configuration are explained.

A main controller 101 in the controller unit 100 includes a CPU. The main controller 101 controls the entire printing apparatus 1 while using a RAM 105 as a work area in accordance with programs and various parameters stored in a ROM 106. For example, via a host I/F 102 or a wireless I/F 103, a print job is input from a host apparatus 300. After that, in accordance with instructions of the main controller 101, an image processing unit 107 obtains printing-target image data from the print job and performs predetermined image processing for the obtained image data. Then, the main controller 101 transmits the image data for which image processing has been performed to the print engine unit 200 via a print engine I/F 108.

It may also be possible for the printing apparatus 1 to obtain printing-target image data from the host apparatus 300 via wireless communication or wired communication, or obtain printing-target image data from an external storage device (USB memory and the like) connected to the printing apparatus 1. The communication method that is utilized for wireless communication and wired communication is not limited. For example, as the communication method that is utilized for wireless communication, it is possible to apply Wi-Fi (Wireless Fidelity) (registered trademark) and Bluetooth (registered trademark). Further, as the communication method that is utilized for wired communication, it is possible to apply USB (Universal Serial Bus) and the like.

An operation panel 104 is a mechanism for receiving an input (instructions) for the printing apparatus 1 by a user and outputting a predetermined notification to a user. It is possible for a user to give instructions to perform the operation, such as copy and scan, and set a printing mode via the operation panel 104. Further, it is possible for a user to recognize information on the printing apparatus 1 via the operation panel 104.

The print controller 201 in the print engine unit 200 includes a CPU. The print controller 201 controls various mechanisms comprised by the print unit 2 while using a RAM 202 as a work area in accordance with programs and various parameters stored in a ROM 203. At the time of printing operation, the print controller 201 conveys the printing sheet S by driving the first feeding unit 6A, the second feeding unit 6B, the conveyance roller 7, the discharge roller 12, and the flapper 11 shown in FIG. 1 via a conveyance control unit 205.

A media determination sensor control unit 206 controls the media determination sensor. Explanation of the media determination sensor control unit 206 will be described later.

The image processing unit 107, the media determination sensor control unit 206, the conveyance control unit 205 and the like may be implemented by the main controller 101 or the print controller 201 executing predetermined programs. Alternatively, they may also be implemented by software and hardware, such as a dedicated IC, collaborating with each other, or part or all of the functions may be implemented by hardware alone.

[About Conveyance of Printing Sheet]

Figure 3A:
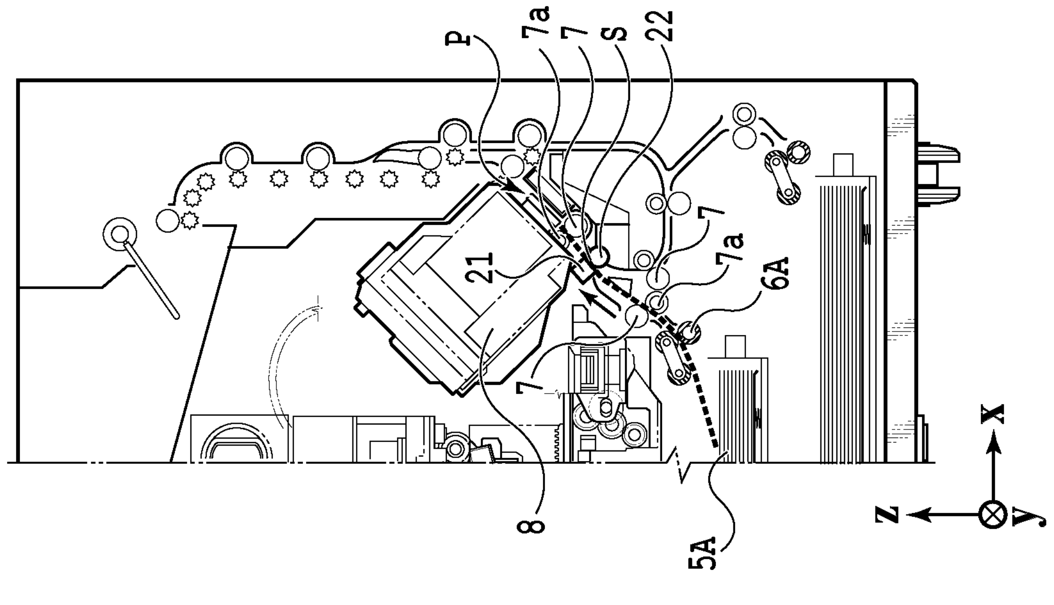
FIG. 3A to FIG. 3C are each a diagram showing a conveyance path of a printing sheet fed from a first cassette.
Figure 3B:
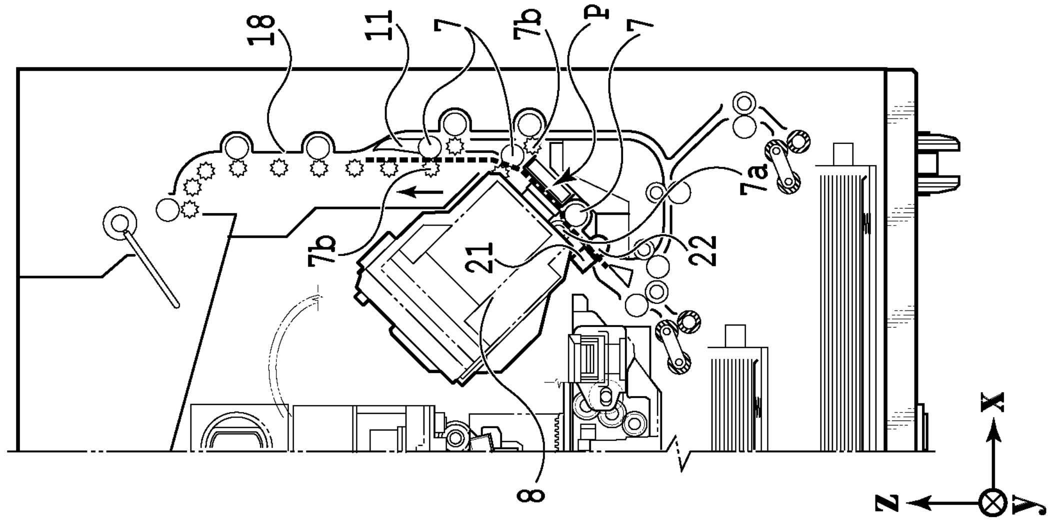
Figure 3C:
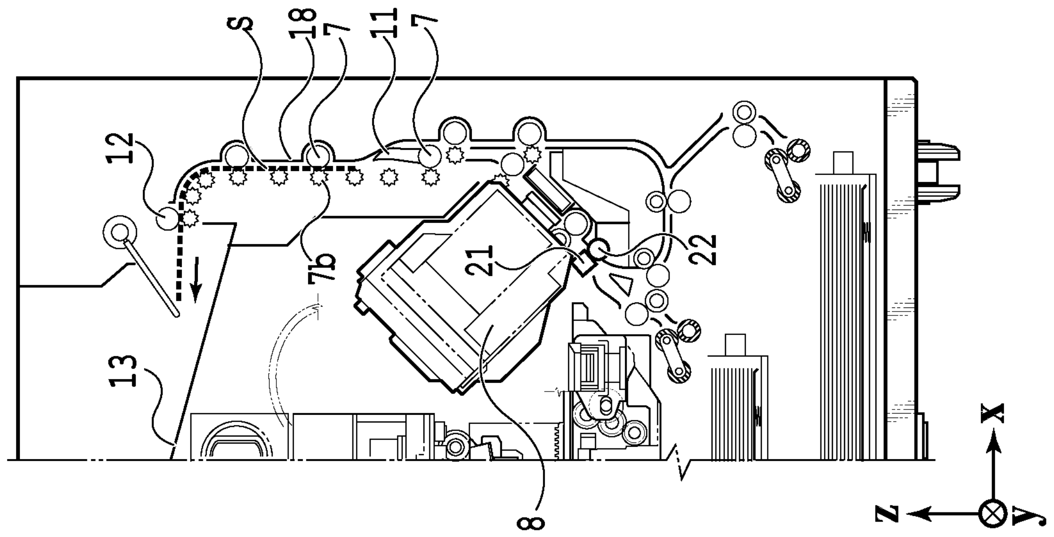

FIG. 3A to FIG. 3C are each a diagram showing a conveyance path in a case where the printing sheet S of A4 size accommodated in the first cassette 5A is fed. In FIG. 3A to FIG. 3C, the printing sheet S is represented by a dotted line.

FIG. 3A is a diagram showing the conveyance state immediately before the front edge of the printing sheet S reaches a printing area P. The printing sheet S stacked at the uppermost portion within the first cassette 5A is separated from the second and subsequent printing sheets by the first feeding unit 6A. Then, the printing sheet S is conveyed toward the area (called printing area P) facing the ejection port surface 8*a* between the platen 9 and the print head 8 while being nipped by the conveyance roller 7 and the pinch roller 7*a*. The traveling direction of the printing sheet S is changed from the horizontal direction (x-direction) to the direction inclined about 45 degrees with respect to the horizontal direction by the time the printing sheet S reaches the printing area P after being fed by the first feeding unit 6A.

By the time the printing sheet S reaches the printing area P, the media determination sensor 21 reads the printing sheet S and the paper type of the printing sheet S is determined based on the image data obtained as a result of the reading. In accordance with the determined paper type, the conveyance condition after this, or the image processing condition for the printing-target image data indicating the image to be printed on the printing sheet S is determined. Details of the paper type determination processing will be described later.

FIG. 3B is a diagram showing the state where the front edge of the printing sheet S passes through the printing area P and is conveyed in the vertically upward direction. In the printing area P, from a plurality of ejection ports provided in the print head 8, ink is ejected toward the printing sheet S. The printing sheet S in the area in which ink is applied is supported by the platen 9 at the rear side thereof and the distance between the ejection port surface 8*a* and the printing sheet S is kept constant. The printing sheet S after ink is applied passes the left side of the flapper 1I whose tip is inclined to the right while being guided by the conveyance roller 7 and the spur 7*b* and is conveyed in the vertically upward direction of the printing apparatus 1 along the guide 18. That is, the traveling direction of the printing sheet S is changed from the position of the printing area P about 45 degrees inclined with respect to the horizontal direction to the vertically upward direction by the conveyance roller 7 and the spur 7*b*.

FIG. 3C shows the state where the front edge of the printing sheet S passes through the discharge roller 12 and the printing sheet S is discharged onto the discharge tray 13. After being conveyed in the vertically upward direction, the printing sheet S is discharged onto the discharge tray 13 by the discharge roller 12 and the spur 7*b*. The discharged printing sheet S is stored on the discharge tray 13 in the state where the side on which an image is printed by the print head 8 faces down.

Figure 4C:
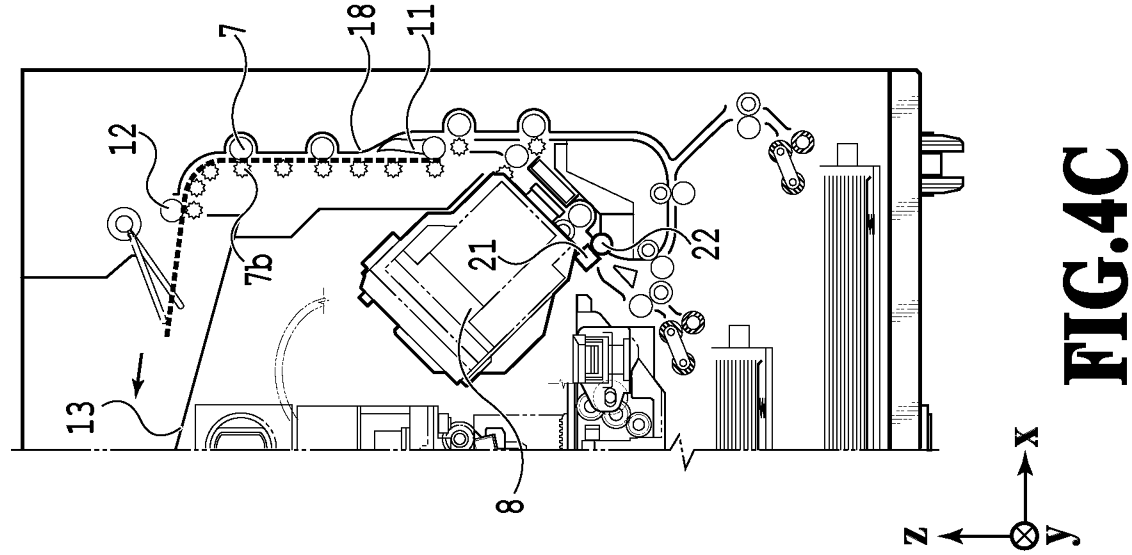
FIG. 4A to FIG. 4C are each a diagram showing a conveyance path of a printing sheet fed from a second cassette.
Figure 4B:
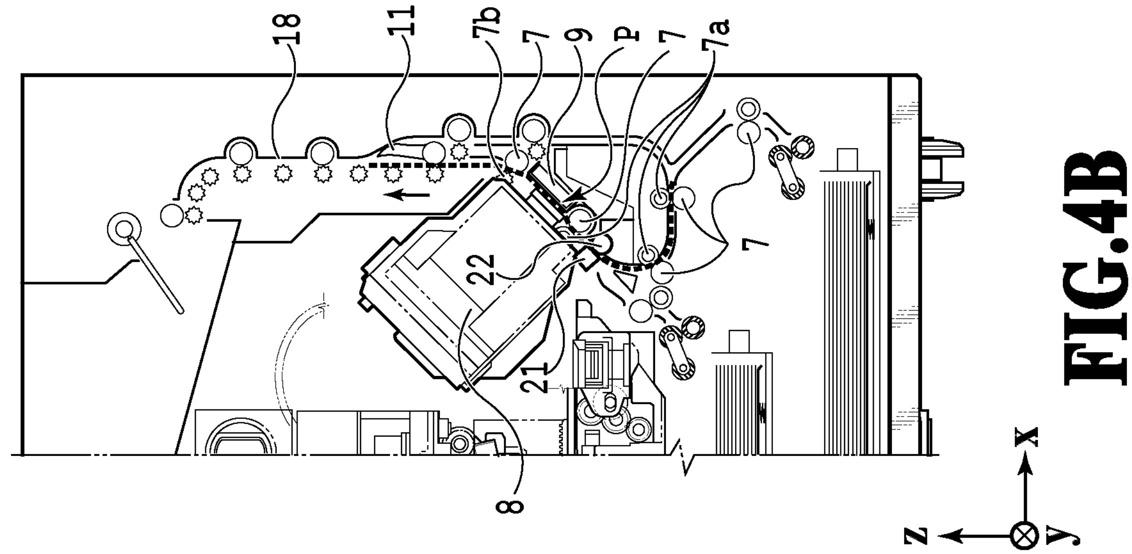
Figure 4A:
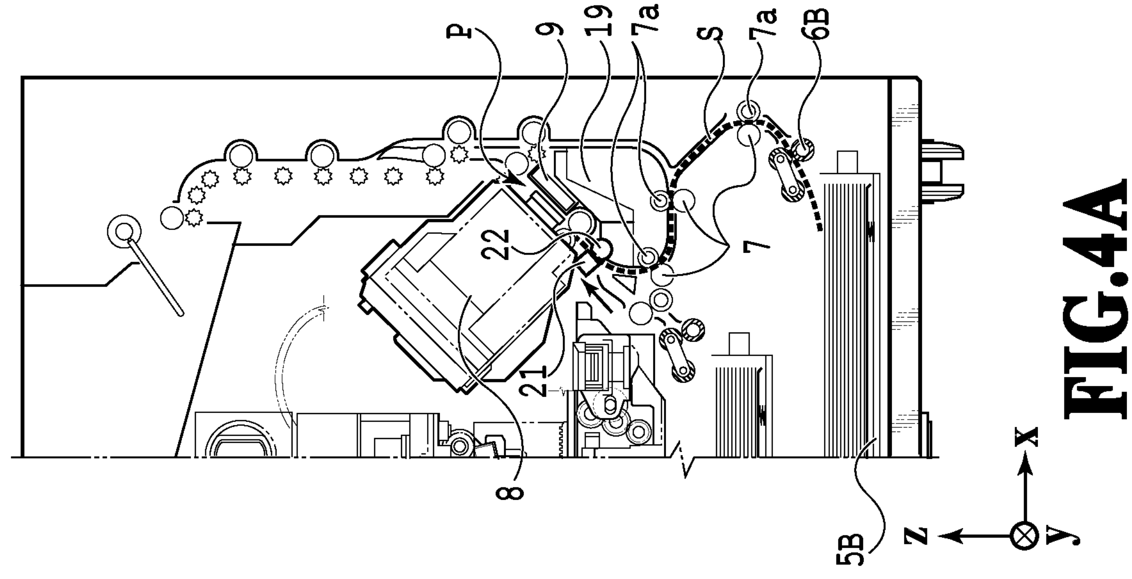

FIG. 4A to FIG. 4C are each a diagram showing the conveyance path in a case where the printing sheet S of A3 size accommodated in the second cassette 5B is fed.

FIG. 4A is a diagram showing the conveyance state immediately before the front edge of the printing sheet S reaches the printing area P. The printing sheet S stacked on the uppermost position within the second cassette 5B is separated from the second and subsequent printing sheets by the second feeding unit 6B and conveyed toward the printing area P between the platen 9 and the print head 5 while being nipped by the conveyance roller 7 and the pinch roller 7*a*. In the conveyance path between the position at which the printing sheet S is fed by the second feeding unit 6B and the position at which the printing sheet S reaches the printing area P, a plurality of the conveyance rollers 7, a plurality of the pinch rollers 7*a*, and the inner guide 19 are arranged, and thereby, the printing sheet S is curved into the shape of the letter S and conveyed up to the platen 9.

As in the case of the printing sheet S of A4 size, for the printing sheet S of A3 size, by the time the printing sheet S reaches the printing area P, the media determination sensor 21 reads the printing sheet S and the paper type of the printing sheet S is determined based on the image data obtained as a result of the reading. In accordance with the determined paper type, the conveyance condition after this, or the image processing condition for the printing-target image data indicating the image to be printed on the printing sheet S is determined.

FIG. 4B is a diagram showing the state where the front edge of the printing sheet S passes through the printing area P and is conveyed in the vertically upward direction. FIG. 4C is a diagram showing the state w % here the front edge of the printing sheet S passes through the discharge roller 12 and the printing sheet S is discharged onto the discharge tray 13. The conveyance path of the printing sheet S of A3 size after the front edge of the printing sheet S passes through the printing area P is the same as in the case of the printing sheet S of A4 size shown in FIG. 3B and FIG. 3C.

[About Configuration of Media Determination Sensor]

Figure 5A:
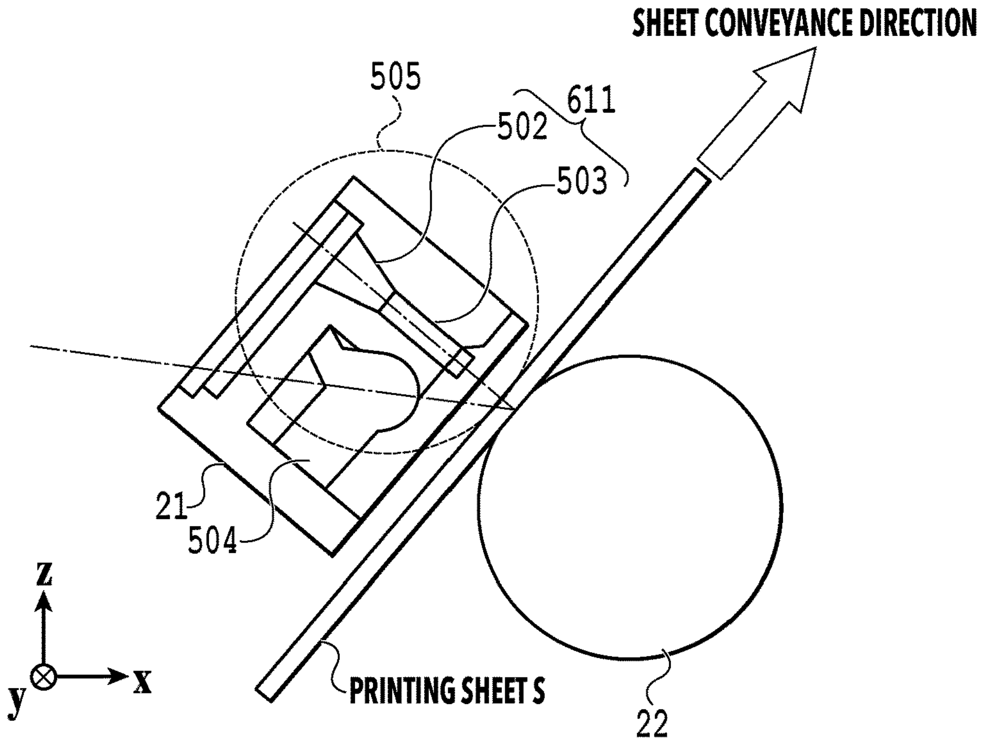
FIG. 5A to FIG. 5C are each a diagram for explaining an internal configuration of a media determination sensor.

FIG. 5A is a diagram showing the internal configuration of the media determination sensor 21. In the present embodiment, explanation is given by taking a case as an example where a contact image sensor (CIS), which is a reflection-type sensor, is employed as the media determination sensor 21.

The media determination sensor 21, which is a CIS, has a linear image sensor 611 and a light guide 504. In the image sensor 611, a photodiode (light-receiving element) 502 and a rod lens array 503 are included. Further, as a mechanism for conveying the printing sheet S that is read by the media determination sensor 21, the media determination sensor roller 22 and the press roller 505 are arranged.

Light emitted by an LED 612 (see FIG. 6), which serves as a light source, passes through the light guide 504 and is reflected from the media determination sensor roller 22 or the printing sheet S. That is, in a case where the printing sheet S is nipped by the media determination sensor roller 22 and the press roller 505 as in FIG. 5A, the light emitted by the LED 612 is reflected from the printing sheet S and further, the light having been transmitted by the printing sheet S is reflected from the media determination sensor roller 22. In a case where the printing sheet is not nipped by the media determination sensor roller 22 and the press roller 505, the light emitted by the LED 612 is reflected from the media determination sensor roller 22.

The configuration is designed so that the light reflected from the media determination sensor roller 22 or the printing sheet S passes through the rod lens array 503 and enters the photodiode 502. By the printing sheet S being nipped by the media determination sensor roller 22 and the press roller 505 and conveyed, it is possible for the media determination sensor 21 to read the light reflected from the printing sheet S at a focal length suitable to the lens.

Figure 5B:
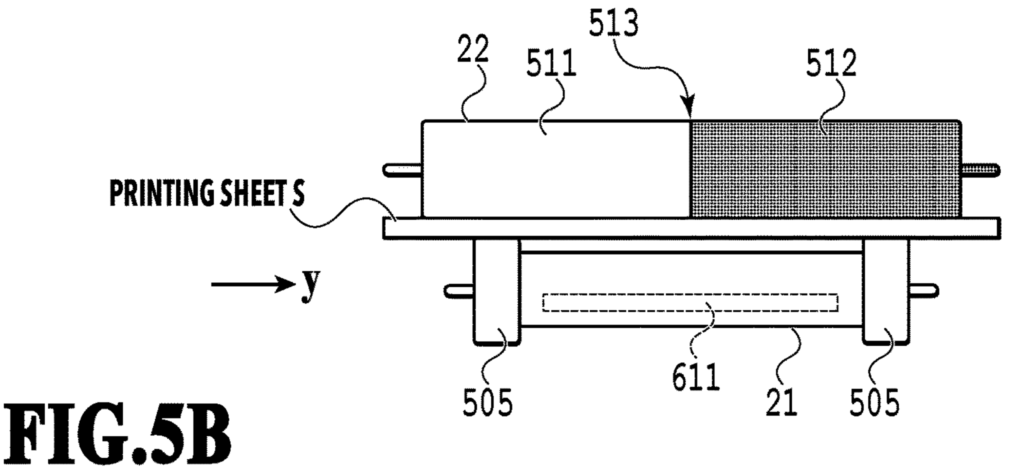

FIG. 5B is a diagram showing a schematic view of the media determination sensor 21 in a case where the media determination sensor 21 is viewed in the sheet conveyance direction.

In the media determination sensor roller 22, at least two reflection members (reflection areas) are included: a white member (white area) 511; and a black member (black area) 512 whose reflectance is lower than that of the white member. A boundary 513 between the white area 511 and the black area 512 exists in the vicinity of the center in the y-direction. The media determination sensor roller 22, which is a reflection member, is located at the position facing the image sensor 611 and in contact with the opposite side of the side that receives light of the printing sheet S at the time the printing sheet S receiving light from the LED 612.

Further, in the media determination sensor 21, the image sensor 611 in which a plurality of the photodiodes 502 is arranged in the form of a line in the y-direction is included. Because of this, it is possible for the media determination sensor 21 to read light reflected from each position corresponding to one line extending in the y-direction of the printing sheet S by one-time reading.

As shown in FIG. 5B, the white area 511, the black area 512, and the image sensor 611 extend in the y-direction. Because of this, by each photodiode 502 of the image sensor 611, which faces the w % bite area 511, the reflected light from each position on the backside of the area within the printing sheet S in contact with the white area 511 is read. Then, image data representing the reading results is obtained. There is a case where the image data obtained by reading the reflected light from the backside of the area within the printing sheet S in contact with the white area 511 is called white background image data.

Similarly, as shown in FIG. 5B, by each photodiode 502 of the image sensor 611, which faces the black area 512, the reflected light from each position on the backside of the area within the printing sheet S in contact with the black area 512 is read. Then, image data representing the reading results is obtained. There is a case where the image data obtained by reading the reflected light from the backside of the area within the printing sheet S in contact with the black area 512 is called black background image data.

By determining in advance the photodiode 502 that receives light corresponding to the black area 512 and the photodiode 502 that receives light corresponding to the white area 511, it is made possible to obtain the white background image data and the black background image data.

In a case w % here light emitted from the light source is transmitted by the printing sheet S, in the light that enters the image sensor 611, the light reflected from the white area 511 is included, but the light reflected from the black area 512 is hardly included. On the other hand, in a case where the printing sheet S hardly transmits light, the light that is caused to enter the image sensor 611 is hardly affected by the light reflected from the white area 511 and the black area 512. Because of this, by comparing the black background image data and the white background image data, it is possible to measure the degree of opaqueness of the printing sheet S without the need to further provide a sensor that measures the quantity of transmitted light. Details will be described later.

As long as it is possible to obtain the black background image data and the white background image data of the printing sheet S, the configuration of the media determination sensor roller 22 is not limited to the configuration in FIG. 5B. For example, the media determination sensor roller 22 may be configured by a plurality of rollers of a white roller corresponding to the white area 511 and a black roller corresponding to the black area 512 in place of being configured by one roller.

Figure 5C:
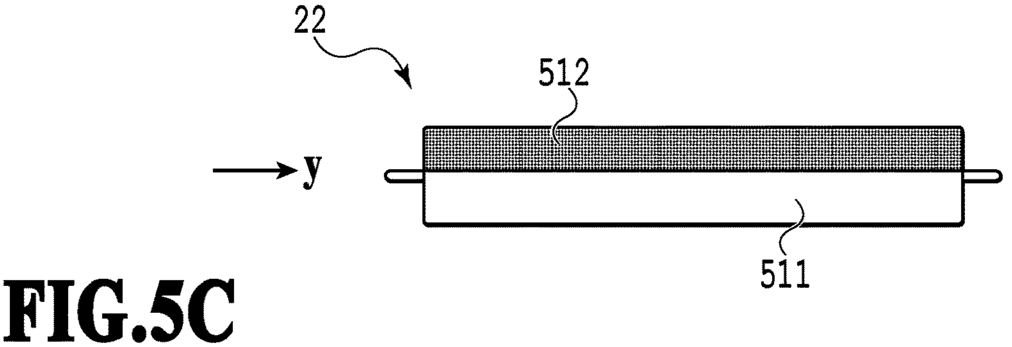

Alternatively, as shown in FIG. 5C, the configuration may be one in which the area of the media determination sensor roller 22, which comes into contact with the printing sheet S, switches between the white area and the black area by the media determination sensor roller 22 rotating. In this case, by the media determination sensor 21 performing reading of data corresponding to one line at the time of the printing sheet S coming into contact with the white area 511 of the media determination sensor roller 22, it is possible to obtain the w % bite background image data. Further, by the media determination sensor 21 performing reading of data corresponding to one line at the time of the printing sheet S coming into contact with the black area 512 of the media determination sensor roller 22, it is possible to obtain the black background image data.

Explanation is given on the assumption that the media determination sensor roller 22 includes the two areas of the white area 511 and the black area 512, but in the media determination sensor roller 22, for example, a third area may be included, which has another reflectance lower than that of white and higher than that of black.

Figure 6:
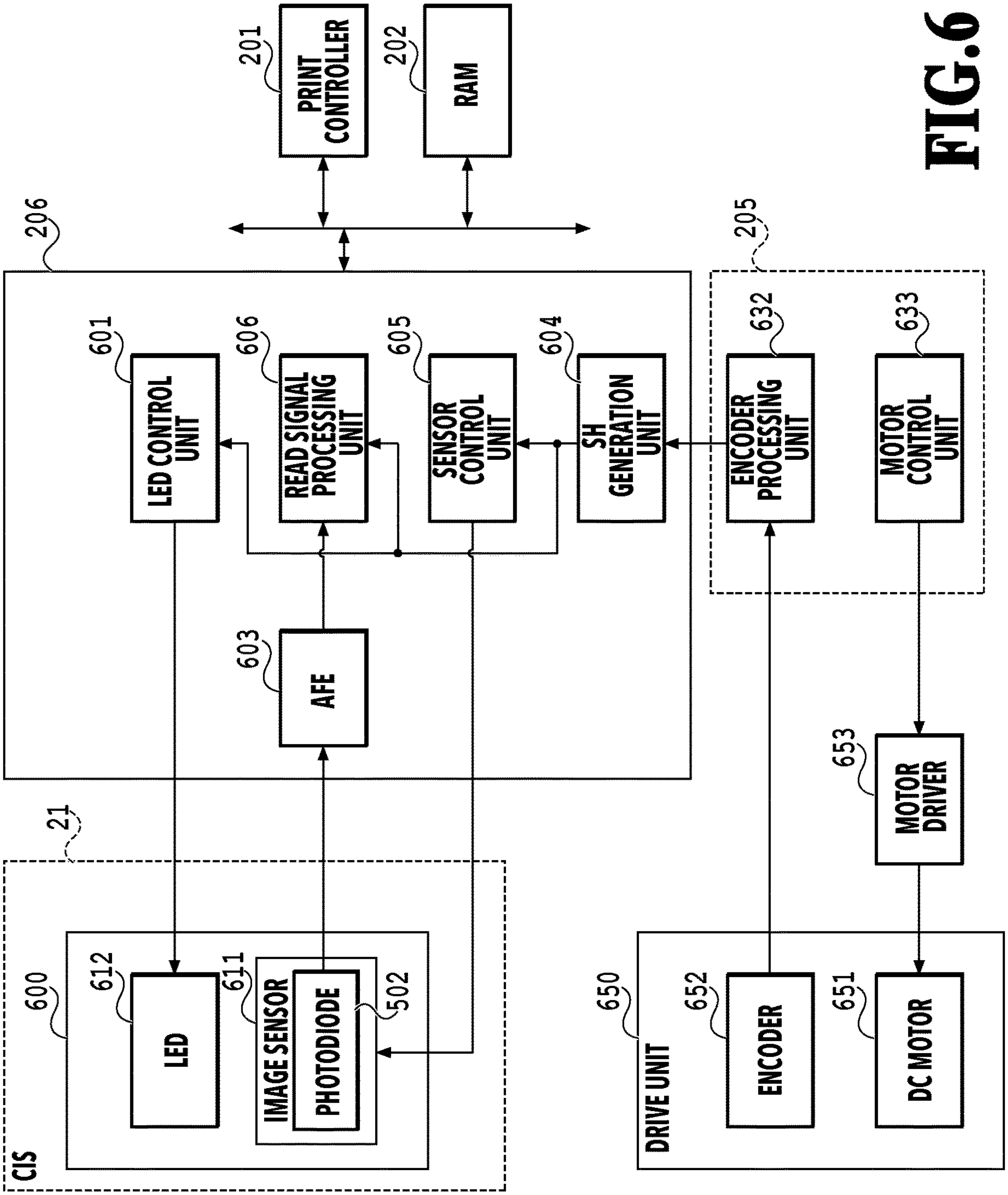
FIG. 6 is a diagram for explaining a function configuration of a media determination sensor control unit.

FIG. 6 is a diagram for explaining the electrical configuration of the media determination sensor control unit 206 and the media determination sensor 21.

The media determination sensor 21 has a CIS module 600. In the CIS module 600, the image sensors 611 arranged in the form of a line, the LED 612, which is a light source for irradiating the printing sheet S with light, and the like are included.

The LED 612 is configured so as to include an R color (Red) LED, a G color (Green) LED, and a B color (Blue) LED corresponding to the three primary colors of light. The LED 612 irradiates the printing sheet S with light at the time of the reading operation of the printing sheet S. In the image sensor 611, a plurality of the photodiodes 502 is arranged side by side in the form of a line. The image sensor 611 accumulates charges for a predetermined time, which are obtained by the light reflected from the sheet surface of the printing sheet S being photoelectrically converted in the photodiode 502, and outputs image data as an image signal after performing voltage conversion.

The image signal that is output from the CIS module 600 is input to an AFE (Analog Front End) 603. The AFE 603 performs sampling for the input image signal and performs analog/digital conversion (A/D conversion) after performing gain & offset adjustment and the like. Then, the image signal is output from the AFE 603 to a read signal processing unit 606 included in the media determination sensor control unit 206.

The read signal processing unit 606 performs image processing, such as packing of the input image signal, shading correction of the image signal, and color correction. The shading correction is performed for correcting the distribution unevenness due to the lens characteristics, the sensitivity unevenness of the image sensor, and the like.

A drive unit 650 includes a DC motor 651, an encoder 652 and the like. The DC motor 651 is a conveyance motor for driving the conveyance roller 7. The encoder 652 is, for example, an optical rotary encoder. In a case where the DC motor 651 makes a predetermined number of rotations (that is, in a case where the printing sheet S is conveyed by a predetermined amount of conveyance), an encoder pulse is output from the encoder 652. The encoder pulse is output in accordance with the number of rotations of the DC motor 651 and used for detecting the amount of drive of the DC motor 651, that is, the amount of conveyance of the printing sheet S. The encoder pulse is input to an encoder processing unit 632.

The encoder processing unit 632 counts the encoder pulse and generates a line start pulse in a case where the number of counts corresponding to one line is reached. The interval of the line start pulse corresponds to the reading time (runtime) of one line. The line start pulse is input from the encoder processing unit 632 to an SH generation unit 604. The line start pulse that is input to the SH generation unit 604 is multiplied to a predetermined number as a horizontally synchronized signal (SH) in the SH generation unit 604. Explanation is given on the assumption that as the image sensor 611 in the present embodiment, a monochrome line sensor is used. Because of this, at the time of color reading, the LED 612 is lit in order of lines of the G color (Green), the B color (Blue), and the R color (Red) and charges are accumulated in the image sensor 611, and therefore, the multiplication number is set to three. The multiplication number is not limited to this. It is possible to set the multiplication number by a register or the like.

In a case where the horizontally synchronized signal (SH) is input, a sensor control unit 605 generates a trigger signal that serves as an accumulation control trigger of the image sensor 611. The image sensor 611 having received the trigger signal performs the charge accumulation of the light-receiving pixel in synchronization with the trigger signal and outputs an image signal to the AFE 603.

Further, the print controller 201 performs feedback control for a motor control unit 633 so as to enable conveyance at a target speed by using conveyance distance information (number of counts of encoder pulse) that is found by the encoder processing unit 632 and speed information (pulse interval). The motor control unit 633 performs PWM (Pulse Width Modulation) control of an electric current that is supplied from a motor driver 653 to the DC motor 651.

As described above, the LED 612 is lit in accordance with the rotation of the DC motor 651, the image sensor 611 starts receiving reflected light, and image data indicating the reading results of the reflected light is generated. However, for the determination of the paper type of the printing sheet S, the image data is used, which is obtained from the reading results of the image sensor 611 in a case where the printing sheet is located at the paper type determination position, to be described later.

[About Determination Processing of Paper Type]

Figure 7:
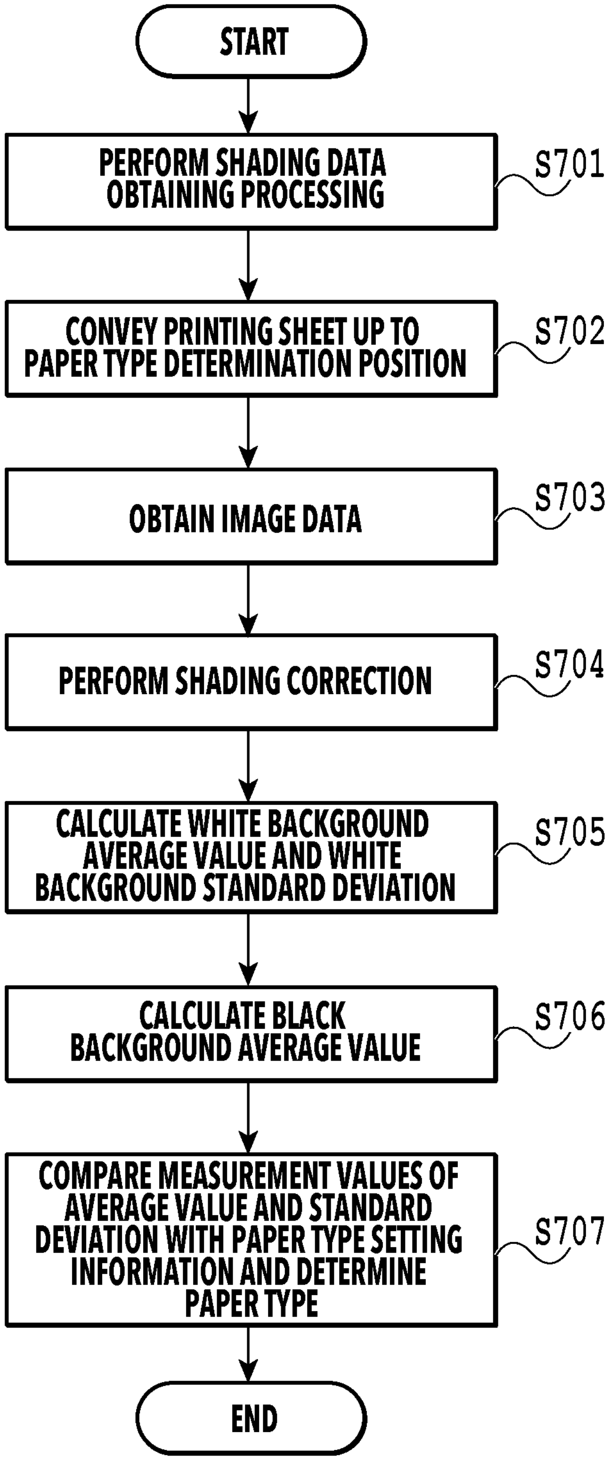
FIG. 7 is a flowchart of paper type determination processing.

FIG. 7 is a flowchart of the determination processing of the paper type. The determination processing of the paper type is started after the printing sheet S is fed and performed by the time the front edge of the printing sheet S reaches the printing area P.

At S701, in response to the determination processing of the paper type being started, shading data obtaining processing of the media determination sensor 21 is performed. The shading data is data for offsetting the individual differences of each of the plurality of the image sensors 611. The shading data obtaining processing is performed before the printing sheet S reaches the media determination sensor roller 22.

In the shading data obtaining processing, the main controller 101 causes the LED 612 to emit light via an LED control unit 601 and causes the image sensor 611 to receive reflected light from the media determination sensor roller 22. Then, the main controller 101 compares the measurement value indicating the actual quantity of received light and the ideal value of the quantity of received light and causes the LED control unit 601 to adjust the quantity of light to be emitted of the LED 113 used as a light source so that the measurement value becomes close to the ideal value. In the state where the quantity of light to be emitted is adjusted, the read signal processing unit 606 obtains the shading data.

At S702, the main controller 101 causes the printing sheet S to be conveyed up to the paper type determination position via the conveyance control unit 205. From the count number of encoder pulses, whether the position of the printing sheet S is the paper type determination position is determined. The paper type determination position is a position at which it is possible for the media determination sensor roller 22 and the press roller 505 to nip the printing sheet S and a position at which the printing sheet S and the media determination sensor 21 are close to each other.

At S703, the main controller 101 causes the LED 612 to emit light toward the printing sheet S being located at the paper type determination position and being conveyed. Then, the main controller 101 obtains image data corresponding to one line obtained by the image sensor 611 receiving the light reflected from the printing sheet S. By the conveyance of the printing sheet S being repeated while the linear image sensor 611 is reading the reflected light corresponding to one line, two-dimensional image data is obtained. For example, the image data representing the results of the portion in the vicinity of the center of the front edge on the downstream side in the conveyance direction of the printing sheet S being read is obtained in the range about 1 cm wide.

The image data corresponding to a plurality of lines corresponding to a plurality of portions of the printing sheet S may be obtained. Alternatively, the image data corresponding to one line of the printing sheet S may be obtained. In this manner, the image data is obtained as data representing the quantity of received light (quantity of reflected light) at each position of the printing sheet S.

The image data that is obtained at S703 is the white background image data and the black background image data described previously. The white background image data and the black background image data may be obtained as image data different from each other, or the image data may be obtained in which the white background image data and the black background image data are together represented as one image. In a case of the image data in which the white background image data and the black background image data are represented as one image, the image (pixels) corresponding to the white area 511 within the obtained image is called white background image data and the image (pixels) corresponding to the black area 512 is called black background image data.

At S704, the read signal processing unit 606 performs shading correction for the obtained image data by using the shading data. Specifically, in the read image data, the read signal processing unit 606 corrects the value obtained by a certain image sensor by the shading data obtained for the image sensor.

At S705, the main controller 101 calculates the feature amount from the corrected white background image data. The main controller 101 of the present embodiment calculates the average value (in the following, called white background average value) of each quantity of received light read by each photodiode of the image sensor 611 arranged at the position facing the white area 511. For example, the main controller 101 calculates the average value of the pixel values of all the pixels of the white background image data as the white background average value. The pixel value is, for example, a luminance value.

Further, the main controller 101 calculates the standard deviation (in the following, called white background standard deviation) of each quantity of received light read by each photodiode of the image sensor 611 arranged at the position facing the white area 511 from the corrected white background image data. For example, the main controller 101 calculates the standard deviation of the pixel values of all the pixels of the white background image data as the white background standard deviation.

At S706, the main controller 101 calculates the feature amount from the corrected black background image data. The main controller 101 of the present embodiment calculates the average value (in the following, black background average value) of each quantity of received light read by each photodiode of the image sensor 611 arranged at the position facing the black area 512. For example, the main controller 101 calculates the average value of the pixel values of all the pixels of the black background image data as the black background average value.

At S707, the main controller 101 compares the calculated white background average value, the black background average value, and the white background standard deviation, and the paper type setting information stored in advance in the ROM 106 and determines the paper type of the printing sheet S. The paper type setting information is information in which each of a plurality of paper types and the feature of the paper type are set in association with each other. By determining the conveyance condition and the image processing condition in accordance with the determined paper type, it is possible to perform print control suitable to the paper type.

Figure 8:
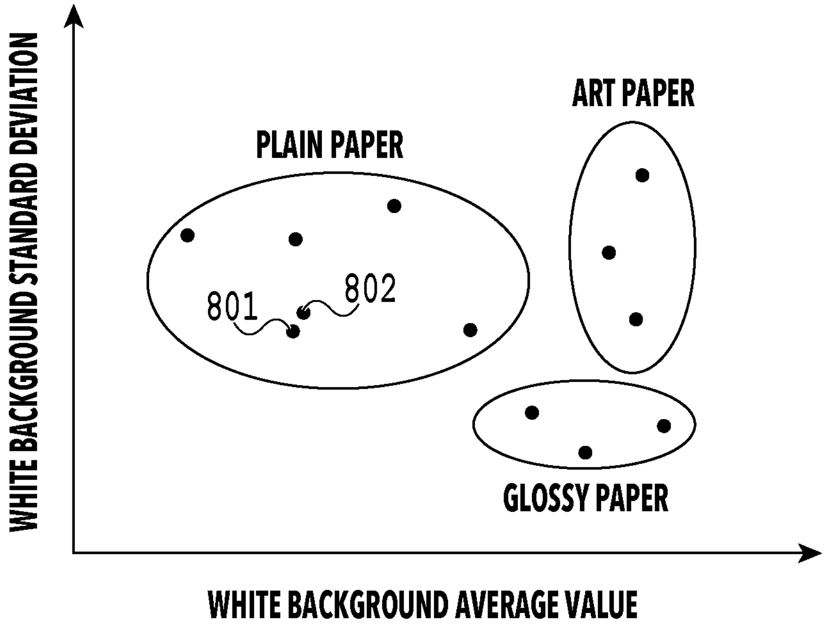
FIG. 8 is a diagram for explaining a relationship between combinations of a white background average value and a white background standard deviation, and paper types.

FIG. 8 is a diagram for explaining an example of paper type setting information. FIG. 8 shows the distribution of combinations of the white background average value and the white background standard deviation for each type of printing sheet. In general, the white background average value of the sheet whose degree of whiteness is high is high. Further, the white background standard deviation of the sheet whose degree of surface smoothness is high is low. Because of this, in the present embodiment, by measuring reflected light, it is possible to determine the paper type whose nature of surface (degree of whiteness and state of roughness) is different.

As shown in FIG. 8, as regards the glossy paper, the degree of whiteness is high and the degree of surface smoothness is high, and therefore, the calculated values are distributed in the area in which the white background average value is high and the white background standard deviation is low. As regards the matte paper, the degree of whiteness is high and the degree of surface smoothness is low, and therefore, the calculated values are distributed in the area in which the average value is high and the standard deviation is high. As regards the plain paper, the difference in the characteristics of the printing sheet is comparatively large, but many printing sheets have the low degree of whiteness and the low degree of surface smoothness, and therefore, the calculated values are distributed in the area in which the white background average value is low and the white background standard deviation is high. Because of this, it is possible to measure the nature of surface of the printing sheet by the combination of the white background average value and the white background standard deviation calculated at S705 and determine the paper type based on the nature of surface.

However, at the time of making an attempt to determine the more detailed paper type, there is a case where it is difficult to determine the paper type by the combination of the white background average value and the white background standard deviation. For example, as shown in FIG. 8, as regards the plain paper, there is a case where points each representing the combination of the white background average value and the white background standard deviation are close to each other, such as a point 801 and a point 802. In this case, provided that the point 801 and the point 802 indicate different paper types (for example, plain paper 1 and plain paper 2), which are included in the paper types of the plain paper, it is difficult to determine whether the plain paper is the plain paper 1 or the plain paper 2 by the combination of the white background average value and the white background standard deviation.

Figure 9:
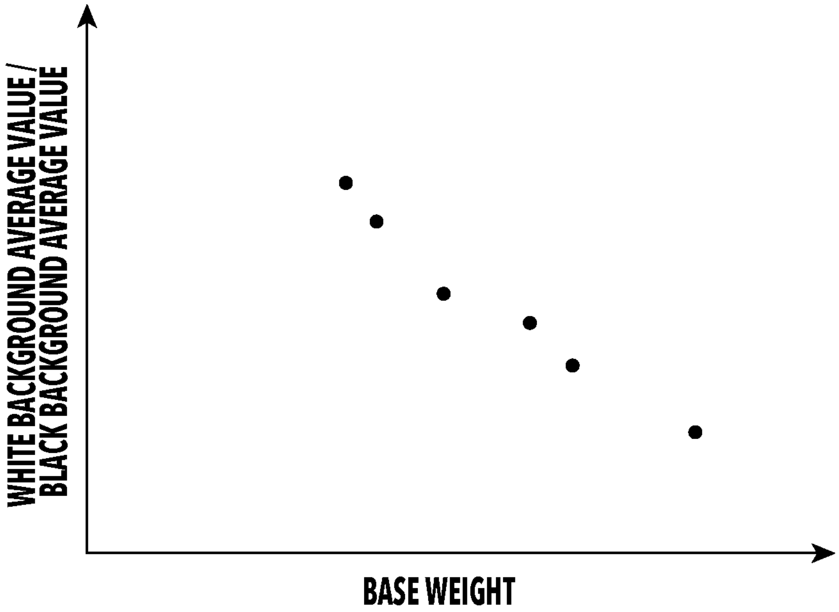
FIG. 9 is a diagram for explaining a relationship between white background average value/black background average value and the base weight in plain paper.

FIG. 9 is a distribution diagram showing a relationship between the ratio between the black background average value and the white background average value of the plain paper calculated from the image data obtained by the media determination sensor 21, and the base weight (degree of opaqueness) of the printing sheet.

In a case where the printing sheet transmits light emitted from the light source, the light is reflected from the white area 511 and enters the image sensor 611. Because of this, in the white background average value, the influence of the light having been transmitted by the printing sheet S and reflected from the white area 511 is included. On the other hand, even though printing sheet S transmits light emitted from the light source, the light is hardly reflected from the black area 512, and therefore, even in a case where the printing sheet S transmits light, in the black background average value, the influence of the light reflected from the black area 512 is hardly included. In a case where the degree of transparency of the printing sheet is low, such as a case where the base weight of the printing sheet is large, the light becomes hard to be transmitted, and therefore, the difference between the white background average value the black background average value becomes small and the ratio between the black background average value and the white background average value becomes close to 1.

As described above, it can be considered that the ratio between the white background average value and the black background average value represents the degree of opaqueness of the printing sheet S. The media determination sensor 21 of the present embodiment is a reflection-type sensor that detects light reflected from the printing sheet S, but in the present embodiment, it is possible to measure the degree of opaqueness of the printing sheet S by the sensor that detects reflected light without the need to further provide a sensor that detects light having been transmitted by the printing sheet S. Because of this, in the present embodiment, it is possible to determine the more detailed paper type, which is not possible only by the characteristics, such as the quantity of specular reflected light and the quantity of diffuse reflected light. Further, as regards the nature of surface of the printing sheet, it is difficult to perform measurement only by the quantity of transmitted light, but in the present embodiment, it is possible to determine the paper type by also taking into consideration the nature of surface of the printing sheet.

As shown in FIG. 9, in a case of plain paper, it is indicated that the larger the base weight, the smaller the ratio between the white background average value and the black background average value becomes. Because of this, from the ratio (degree of opaqueness) between the white background average value and the black background average value, it is possible to determine the more detailed paper type whose base weight is different. For example, as regards the printing sheet S determined to be plain paper by using FIG. 8, by comparing the ratio (degree of opaqueness) between the white background average value and the black background average value, and the paper type setting information on plain paper stored in advance in the ROM 106, which is indicated in Table 1, it is possible to determine the more detailed paper type, which is included in the paper types of plain paper.

TABLE 1

| | plain paper 1 | plain paper 2 | plain paper 3 |
|---|---|---|---|
| white background average value/ black background average value | 1.12 | 1.10 | 1.06 |

Plain paper 1 in Table 1 is thin plain paper. As described above, at S707, it is possible for the main controller 101 to determine that the printing sheet whose white background average value is low, whose white background standard deviation is high, and whose ratio between the white background average value and the black background average value is small is thin plain paper (plain paper 1).

As explained above, in the present embodiment, from the image data obtained by the image sensor, it is possible to measure the nature of surface of the printing sheet S. Further, by comparing the quantity of received light detected by the image sensor at the position facing the white area 511 and the quantity of received light detected by the image sensor at the position facing the black area 512, it is possible to measure the degree of opaqueness of the printing sheet S. As described above, according to the present embodiment, it is possible to measure the nature of surface and the degree of opaqueness by one image sensor. Because of this, it is possible to determine the more detailed paper type from the nature of surface and the degree of opaqueness of the printing sheet. Consequently, by determining the conveyance condition, the image processing condition or the like in accordance with the paper type, it is possible to perform print control suitable to the paper type.

In the present embodiment, explanation is given on the assumption that from the black background image data, only the black background average value is calculated. It may also be possible for the main controller 101 to calculate the standard deviation (in the following, called black background standard deviation) of each quantity of received light detected by each photodiode of the image sensor 611 arranged at the position facing the black area from the corrected black background image data. Then, it may also be possible to determine the paper type by using the black background average value in place of the white background average value in FIG. 8, and by using the black background standard deviation in place of the white background standard deviation in FIG. 8.

In the explanation described above, explanation is given on the assumption that the white background standard deviation or the black background standard deviation is calculated, but what is calculated is not limited to the standard deviation provided that a value indicating the variation of the quantity of received light is calculated. For example, the variance may be calculated in place of the standard deviation.

Further, in the media determination sensor roller 22 in FIG. 5B, the boundary 513 exists in the y-direction. In this case, it is considered that the photodiode 502 facing the boundary 513 detects light including both the reflected light from the white area 511 and the reflected light from the black area 512. Because of this, it may also be possible not to use the results read by the photodiode 502 facing the portion in the vicinity of the boundary 513 of the media determination sensor roller 22. That is, the white background average value, the black background average value, the white background standard deviation, or the black background standard deviation may be calculated without using the pixel value of the pixel indicating the detection results of the photodiode 502 corresponding to the portion in the vicinity of the boundary 513 among the image data.

Further, the paper type may be determined only by the white background average value and the black background average value without using the standard deviation. For example, the degree of whiteness of the printing sheet S is found from the white background average value and further, the degree of opaqueness of the printing sheet S is found by the ratio between the white background average value and the black background average value and the paper type of the printing sheet S may be determined based on the combination of the degree of whiteness and the degree of transparency.

According to the technique of the present disclosure, it is possible to determine the detailed type of the printing sheet.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-019458 filed Feb. 10, 2022, which is hereby incorporated by reference herein in its entirety.

What is claimed is:

1. A printing apparatus comprising:

a light source configured to emit light to a first surface of a printing sheet;

a sensor configured to detect the light reflected from the printing sheet;

a reflection member located at a position facing the sensor and coming into contact with a second surface opposite to the first surface of the printing sheet, the first surface receiving the light at the time of the printing sheet receiving the light;

a conveyance mechanism configured to convey the printing sheet; and a control unit configured to determine a type of the printing sheet based on a feature amount obtained by the sensor detecting the light from a plurality of positions of the printing sheet being conveyed, wherein a first area and a second area whose reflectance is lower than that of the first area are included in the reflection member and a position corresponding to the first area and a position corresponding to the second area are included in the plurality of positions.

2. The printing apparatus according to claim 1, wherein the control unit calculates, as the feature amount, a first feature amount obtained by the sensor detecting the light from each position of the printing sheet corresponding to the first area and a second feature amount obtained by the sensor detecting the light from each position of the printing sheet corresponding to the second area and determines the type of the printing sheet based on the first feature amount and the second feature amount.

3. The printing apparatus according to claim 2, wherein the control unit calculates at least a first value that is an average value of each value obtained by the sensor detecting the light from each position of the printing sheet corresponding to the first area as the first feature amount and a second value that is an average value of each value obtained by the sensor detecting the light from each position of the printing sheet corresponding to the second area as the second feature amount.

4. The printing apparatus according to claim 3, wherein the control unit determines the type of the printing sheet by using at least results of comparing a value based on the first value and the second value and information associated with each type of a plurality of printing sheets.

5. The printing apparatus according to claim 3, wherein the control unit further calculates, as the first feature amount, a third value representing variations of each value obtained by the sensor detecting the light from each position of the printing sheet corresponding to the first area.

6. The printing apparatus according to claim 5, wherein the type of the printing sheet is determined by using at least results of comparing a combination of the first value and the third value and information associated with each type of a plurality of printing sheets.

7. The printing apparatus according to claim 1, wherein the control unit obtains information in which a feature of each type of a plurality of printing sheets is set and determines the type of the printing sheet by comparing the feature amount obtained by the sensor detecting the light and the feature included in the information.

8. The printing apparatus according to claim 1, wherein the control unit determines the type of the printing sheet by calculating, as the feature amount, at least a feature amount representing a nature of a surface of the printing sheet and a feature amount representing a degree of opaqueness of the printing sheet.

9. The printing apparatus according to claim 8, wherein the feature amount representing the nature of the surface of the printing sheet includes a feature amount representing a degree of smoothness of the printing sheet and a feature amount representing a degree of whiteness of the printing sheet.

10. The printing apparatus according to claim 1, further comprising:

a printing unit configured to print an image on the printing sheet being conveyed, wherein the sensor and the reflection member are arranged on an upstream side with respect to a conveyance direction of the printing unit in a conveyance path of the printing sheet.

11. The printing apparatus according to claim 1, wherein the control unit obtains image data obtained by the sensor detecting the light from a plurality of positions of the printing sheet and calculates the feature amount from a pixel value included in the image data.

12. The printing apparatus according to claim 1, wherein a boundary between the first area and the second area exists in a direction that intersects with a conveyance direction of the printing sheet in the reflection member.

13. The printing apparatus according to claim 1, wherein the sensor is a reflection-type line sensor.

14. The printing apparatus according to claim 13, wherein the control unit calculates the feature amount from image data obtained by the sensor detecting the light from a plurality of lines in the printing sheet.

15. A control method of a printing apparatus, the printing apparatus comprising:

a light source configured to emit light to a first surface of a printing sheet;

a sensor configured to detect the light reflected from the printing sheet;

a reflection member located at a position facing the sensor and coming into contact with a second surface opposite to the first surface of the printing sheet, the first surface receiving the light at the time of the printing sheet receiving the light; and a conveyance mechanism that conveys the printing sheet, wherein a first area and a second area whose reflectance is lower than that of the first area are included in the reflection member, the control method comprising:

determining a type of the printing sheet based on a feature amount obtained by the sensor detecting the light from a plurality of positions of the printing sheet, wherein a position corresponding to the first area and a position corresponding to the second area are included in the plurality of positions.

* * * * *